US009428859B2

(12) United States Patent
Higuchi et al.

(10) Patent No.: US 9,428,859 B2
(45) Date of Patent: Aug. 30, 2016

(54) SHEET MANUFACTURING APPARATUS AND DEFIBRATING UNIT

(71) Applicant: SEIKO EPSON CORPORATION, Tokyo (JP)

(72) Inventors: Naotaka Higuchi, Fujimi-machi (JP); Toshiaki Yamagami, Nagano (JP); Nobumasa Abe, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/486,486

(22) Filed: Sep. 15, 2014

(65) Prior Publication Data

US 2015/0096701 A1 Apr. 9, 2015

(30) Foreign Application Priority Data

Oct. 9, 2013 (JP) ................... 2013-211678

(51) Int. Cl.
| | |
|---|---|
| *D21D 5/18* | (2006.01) |
| *D21B 1/06* | (2006.01) |
| *B02C 4/10* | (2006.01) |
| *B02C 4/28* | (2006.01) |
| *B02C 4/30* | (2006.01) |

(52) U.S. Cl.
CPC .. *D21D 5/18* (2013.01); *B02C 4/10* (2013.01); *B02C 4/286* (2013.01); *B02C 4/30* (2013.01); *D21B 1/06* (2013.01)

(58) Field of Classification Search
CPC ........... D21D 5/24; D21D 1/30; D21D 1/306; B02C 7/00; B02C 7/02; B02C 7/04; B02C 7/06; B02C 7/08; B02C 7/11; B02C 7/18; B02C 13/08; B02C 13/26; B02C 15/006; B02C 18/062; B02C 2013/2869; D21B 1/02; D21B 1/04; D21B 1/06; D21B 1/061; D21B 1/063; B29B 17/0412; B29B 2017/0488
See application file for complete search history.

(56) References Cited

U.S. PATENT DOCUMENTS

| | | | | |
|---|---|---|---|---|
| 2,785,865 | A * | 3/1957 | Berling | 241/55 |
| 3,346,197 | A * | 10/1967 | Sagar | 241/23 |
| 3,482,791 | A * | 12/1969 | Alliegro | 241/296 |
| 4,202,505 | A * | 5/1980 | Ruuskanen | 241/247 |
| 6,637,682 | B2 | 10/2003 | Akiyama et al. | |
| 7,300,540 | B2 * | 11/2007 | Sabourin et al. | 162/23 |
| 7,713,381 | B2 * | 5/2010 | Sabourin et al. | 162/23 |
| 7,735,760 | B2 * | 6/2010 | Hanson et al. | 241/46.013 |
| 7,753,297 | B2 * | 7/2010 | Hanson et al. | 241/46.013 |
| 7,861,959 | B2 * | 1/2011 | Eriksen | 241/186.35 |
| 8,882,965 | B2 * | 11/2014 | Yamagami et al. | 162/261 |

(Continued)

FOREIGN PATENT DOCUMENTS

| | | | |
|---|---|---|---|
| DE | 102010016011 A1 * | 9/2011 | |
| JP | 52144407 A * | 12/1977 | |

(Continued)

*Primary Examiner* — Jose Fortuna
(74) *Attorney, Agent, or Firm* — Global IP Counselors, LLP

(57) ABSTRACT

The sheet manufacturing apparatus includes the defibrating unit configured to carry out a dry-type defibrating process on defibration object by rotating a rotating unit, and manufactures sheets by accumulating and heating at least a portion of defibrated material on which the dry-type defibrating process is carried out. The rotating unit includes a rotor that has a plurality of protruding sections on an outer circumference of the rotor, and a feeding blade configured to generate a flow of air and arranged on a side section of the rotor on a side of the input section for the defibration object.

10 Claims, 9 Drawing Sheets

(56) References Cited

U.S. PATENT DOCUMENTS

| | | | |
|---|---|---|---|
| 2014/0027075 A1 | 1/2014 | Yamagami et al. | |
| 2014/0290884 A1* | 10/2014 | Yamagami et al. | 162/158 |
| 2014/0290890 A1* | 10/2014 | Seki et al. | 162/261 |
| 2014/0374047 A1* | 12/2014 | Yamagami | 162/261 |
| 2015/0096701 A1* | 4/2015 | Higuchi et al. | 162/261 |
| 2015/0096702 A1* | 4/2015 | Higuchi et al. | 162/261 |

FOREIGN PATENT DOCUMENTS

| | | | |
|---|---|---|---|
| JP | 2008-031578 A | | 2/2008 |
| JP | 2012-144819 A | | 8/2012 |
| JP | 2012144819 A | * | 8/2012 |
| JP | 2012144825 A | * | 8/2012 |
| JP | 2012144826 A | * | 8/2012 |
| WO | WO 0071810 A1 | * | 11/2000 |
| WO | WO 2012095928 A1 | * | 7/2012 |

* cited by examiner

SHEET MANUFACTURING APPARATUS AND DEFIBRATING UNIT

CROSS-REFERENCE TO RELATED APPLICATIONS

This application claims priority to Japanese Patent Application No. 2013-211678 filed on Oct. 9, 2013. The entire disclosure of Japanese Patent Application No. 2013-211678 is hereby incorporated herein by reference.

BACKGROUND

1. Technical Field

The present invention relates to a sheet manufacturing apparatus and a defibrating unit.

2. Related Art

A process (disintegrating process), where a material which is a raw material is changed into fiber before the process of being changed into sheets, is typically performed in the field of sheet manufacturing. A wet system which uses a large amount of water is currently mainstream as the disintegrating process. Accordingly, processes such as water removal and drying are necessary after the sheets are formed. In addition, it is difficult to reduce the size of a sheet manufacturing apparatus since a large amount of equipment for installations for water, electrical power, water discharge, and the like are necessary. As a result, it is difficult to respond to current demands for energy saving, protecting the environment, and the like.

As a sheet manufacturing method to replace the manufacturing method in the prior art as above, there are expectations for a method which uses very little or no water which is referred to as a dry type, but a technique for manufacturing completely with a dry type, from raw materials to sheets as the final product, has not yet been sufficiently established in the manufacturing of sheets at the current point in time. Here, disintegrating raw materials such as used paper or pulp using a dry type is typically referred to as defibrating.

A defibrating apparatus with a system where a flow of air is generated by rotating a rotating unit and defibration object is transported using the flow of air is disclosed in Japanese Unexamined Patent Application Publication No. 2007-144819.

In the defibrating apparatus, for example, (small pieces of) paper as the defibration object is gradually defibrated and changed into fibers. As a result, it is necessary that different substances are transferred at the input port side and the output port side of the defibrating apparatus. However, in the technique described in Japanese Unexamined Patent Application Publication No. 2007-144819, there is a concern that transfer problems will be generated in a defibrating unit with a system where the defibration object is transported by relying on only the flow of air which is generated by rotating of the rotating unit.

SUMMARY

The present invention is carried out in order to solve a portion of the problems described above and is able to be realized as the following aspects and applied examples.

An aspect of a sheet manufacturing apparatus according to the invention includes a defibrating unit configured to carry out a dry-type defibrating process on defibration object by rotating a rotating unit, and manufactures sheets by accumulating and heating at least a portion of defibrated material on which the dry-type defibrating process is carried out. The rotating unit includes a rotor which has a plurality of protruding sections on an outer circumference of the rotor, and a feeding blade configured to generate a flow of air and arranged on a side section of the rotor on a side of an input section for the defibration object.

According to this sheet manufacturing apparatus, it is possible to effectively feed the defibration object toward the rotor since the feeding blade which generates a flow of air is provided on the input section side in the defibrating unit. Due to this, it is possible to prevent the defibration object building up on the input section side. In addition, since it is possible to generate a flow of air from the upstream side to the downstream side of the distribution path of the defibration object by providing the feeding blade, it is possible to generate a flow of air which is stronger than a flow of air which is generated using only the rotor and it is possible to suppress transfer problems being generated in the defibrating unit. As a result, it is possible to stably manufacture sheets which are strong in practice. Here, the sheet manufacturing apparatus has the following effects compared to a case where the feeding blade is provided on the output side for defibrated material. In a case where the feeding blade is provided on the output side for defibrated material, it is easy to transfer materials in a fibrous form at the output side for defibrated material, but the flow of air with regard to the materials (for example, paper) at the input side for defibrated material and it is difficult to transfer materials. In contrast to this, by providing the feeding blade on the input side for defibrated material, it is possible for the flow of air to work with regard to the material in a state which is difficult to transfer and feeding is possible by the feeding blade hitting up against the materials. As a result, it is better for the feeding blade to be on the input section side instead of the output section side.

In the sheet manufacturing apparatus according to the invention, the feeding blade has a blade section which stands up in an extending direction of the central rotation axis of the rotor.

According to this sheet manufacturing apparatus, defibrating is easy by the defibration object being hit by the blade section. That is, it is possible to feed the defibration object to the rotor with the defibration object having been reduced in size by being crushed. Furthermore, the defibration object which is input from the input section is mixed up using the feeding blade and it is possible to suppress deviations in supplying of the defibration object with regard to the entire circumference of the rotor.

In the sheet manufacturing apparatus according to the invention, the input section for the defibration object may be positioned in a direction to be further from the rotor more than the feeding blade in the extending direction of the central rotation axis.

According to this sheet manufacturing apparatus, it is possible to more effectively feed the defibration object to the rotor using the feeding blade. A feeding effect and a crushing effect are reduced since a force in a direction of returning works with regard to inputting from the input section in a case where the feeding blade and the input section are in the same position in the extending direction of the central rotation axis and it is not possible for the defibration object to come into contact with the feeding blade when the input section is arranged closer to the rotor in the extending direction of the central rotation axis with regard to the feeding blade. In contrast to this, it is possible to further exhibit a feeding effect and a crushing effect by arranging the input section on the side which is further from the rotor.

In the sheet manufacturing apparatus according to the invention, an input port in the input section for the defibration object may be positioned more to a side of the central rotation axis than an outermost circle in a trajectory generated while the blade section rotates, in a direction which is orthogonal to the central rotation axis.

In the defibrating unit of this sheet manufacturing apparatus, the defibration object is input from the inner side of the trajectory of the outermost portion of the blade section. As a result, it is easy for the defibration object to be dispersed in a radial formation from the central rotation axis to the outside and it is possible to feed the defibration object with regard to the rotor in a state with fewer deviations in the circumference direction of the rotor.

In the sheet manufacturing apparatus according to the invention, the rotor may have a base section on a side which is close to the central rotation axis and a plurality of the protruding sections which protrude from the base section in a direction to be further from the central rotation axis, and the feeding blade may be attached to the base section.

According to the defibrating unit of this sheet manufacturing apparatus, there are no gaps between the rotor and the feeding blade and it is easy to feed the defibration object with regard to the rotor since the feeding blade is attached to the base section.

In the sheet manufacturing apparatus according to the invention, a size of the feeding blade from the central rotation axis may be larger than the base section and may be smaller than the protruding sections.

According to the defibrating unit of this sheet manufacturing apparatus, since the size of the feeding blade from the central rotation axis is larger than the base section, there is a larger action of moving the defibration object to the side which is farther from the central rotation axis than the base section. In addition, since the size of the feeding blade from the central rotation axis is more to the central rotation axis side than the trajectory of the front edge of the protruding sections when rotating, it is possible to maintain a sufficient defibrating effect.

In the sheet manufacturing apparatus according to the invention, the rotor may be a layering of a plurality of rotating plates which have the base section and the protruding sections, and the feeding blade may be fixed along with the plurality of rotating plates.

It is possible for the defibrating unit of this sheet manufacturing apparatus to have the feeding blade installed along with the rotor which includes a plurality of rotating plates. As a result, it is possible to reduce the number of members such as fixing tools and the like.

In the sheet manufacturing apparatus according to the invention, the rotor may have an opening and the feeding blade may cover the opening.

In the defibrating unit of this sheet manufacturing apparatus, it is possible to have a lighter weight by installing the opening which for reducing the use of materials or the like and it is possible to close the opening using the feeding blade. Due to this, it is possible to prevent the defibration object from entering into the opening which for reducing the use of materials or the like.

In the sheet manufacturing apparatus according to the invention, there may be a cutting unit which cuts the defibration object on the upstream side of the defibrating unit.

According to this sheet manufacturing apparatus, it is possible to more easily feed the defibration object to the rotor using the feeding blade. In addition, it is possible for it to be easy to transport the defibration object using the flow of air from the feeding blade since the volume of defibration object is reduced due to cutting by the cutting unit.

An aspect of a defibrating unit according to the invention is configured to carry out a dry-type defibrating process on defibration object by rotating a rotating unit. The rotating unit includes a rotor that has a plurality of protruding sections on an outer circumference of the rotor, and a feeding blade configured to generate a flow of air and arranged on a side section of the rotor on a side of the input section for the defibration object.

According to this defibrating unit, it is possible to effectively feed the defibration object toward the rotor since the feeding blade which generates a flow of air is provided on the input section side. In addition, by providing the feeding blade, it is possible to generate a flow of air which is stronger than a flow of air which is generated using only the rotor. Due to this, it is possible to suppress transfer problems being generated in the defibrating unit.

BRIEF DESCRIPTION OF THE DRAWINGS

Referring now to the attached drawings which form a part of this original disclosure.

DETAILED DESCRIPTION OF EXEMPLARY EMBODIMENTS

Several embodiments of the present invention will be described below. The embodiments described below will be described as examples of the invention. The invention is not limited to the following embodiments and various modifications, which are carried out within a scope which does not depart from the gist of the invention, are included. Here, none of the configurations described below limit the configuration which is essential for the invention.

1. Sheet Manufacturing Apparatus

A sheet manufacturing apparatus 1000 according to the present embodiment will be described below by appropriately referencing FIGS. 1-10.

Figure 1:
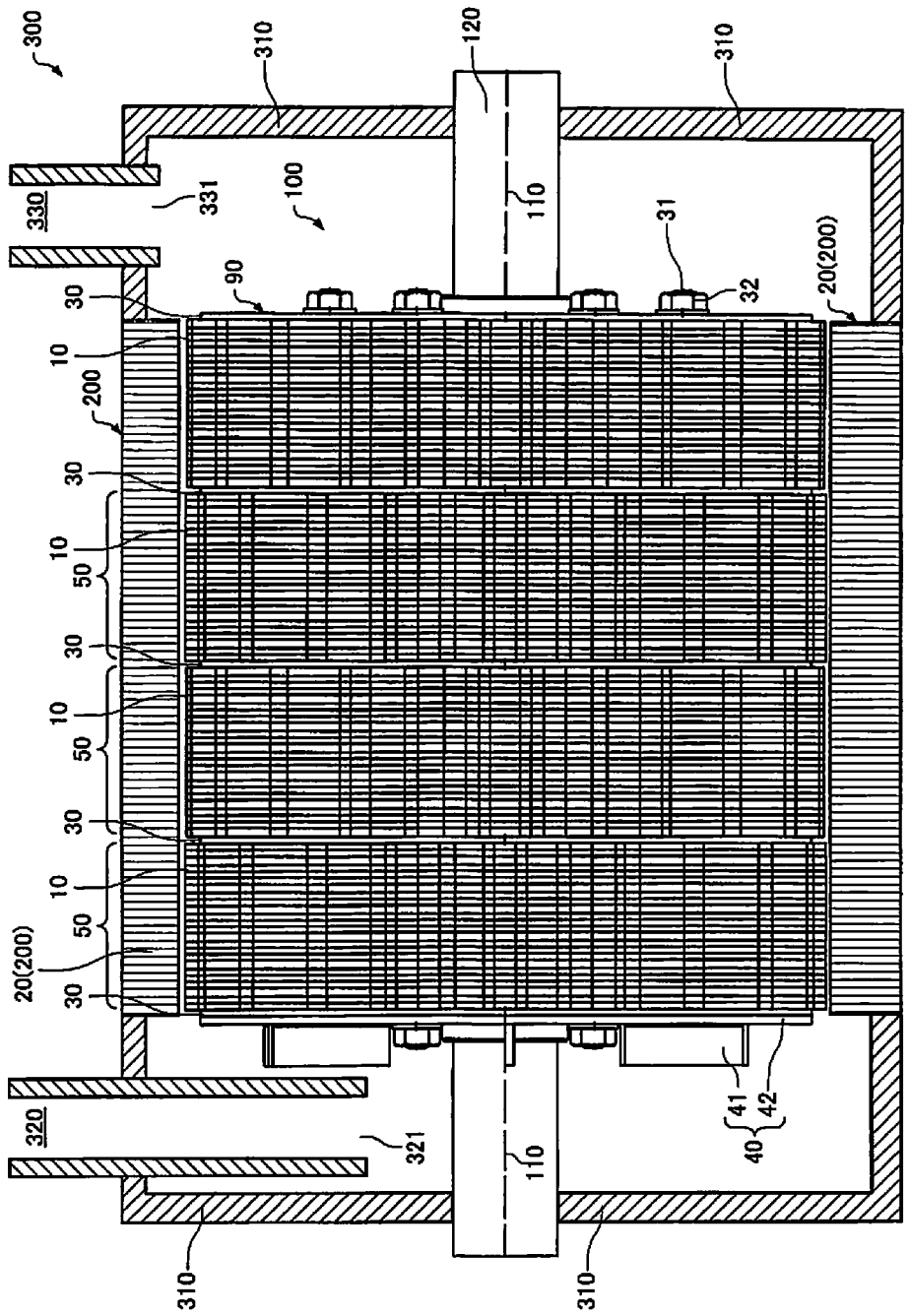
FIG. 1 is a schematic diagram illustrating a partial cross section of a defibrating unit according to an embodiment.
Figure 3:
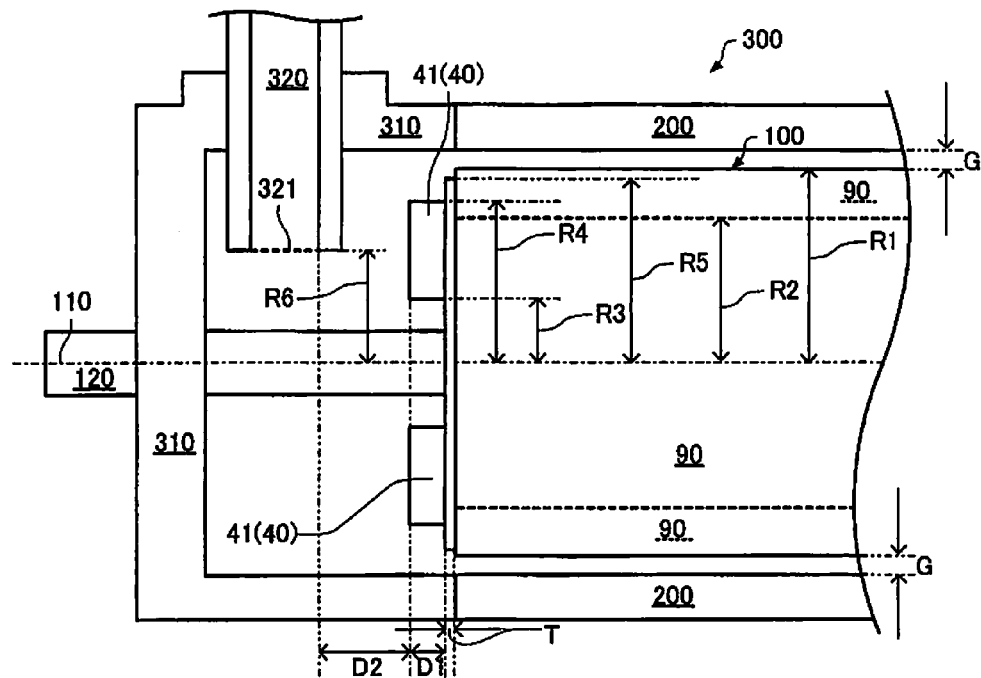
FIG. 3 is a schematic diagram illustrating a main portion of a defibrating unit according to an embodiment viewed from a direction which is orthogonal to a central rotation axis.
Figure 4:
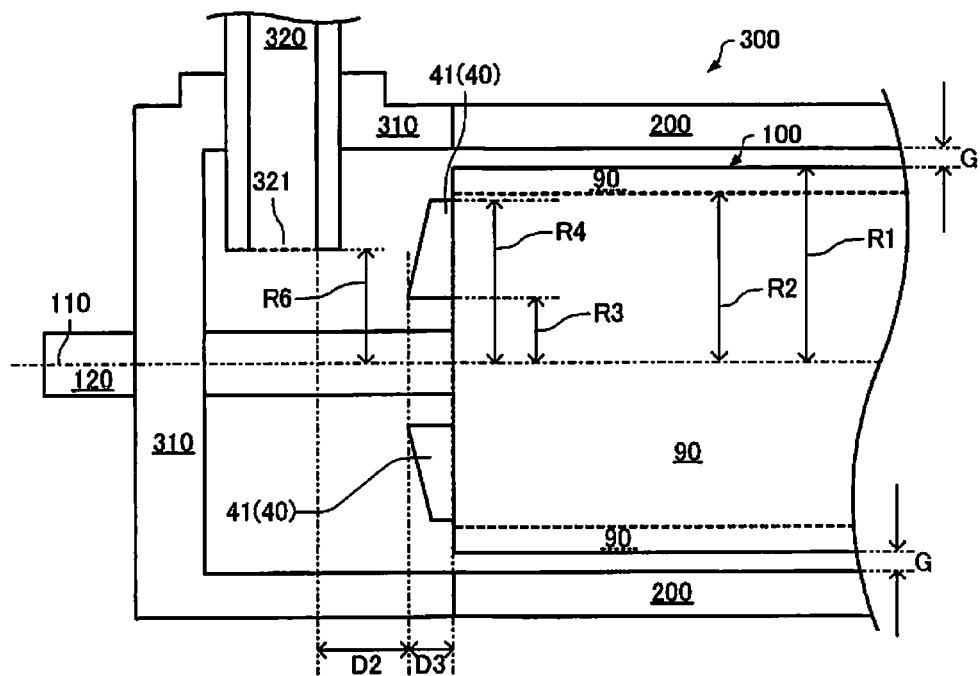
FIG. 4 is a schematic diagram illustrating a main portion of a defibrating unit according to an embodiment viewed from a direction which is orthogonal to a central rotation axis.
Figure 5:
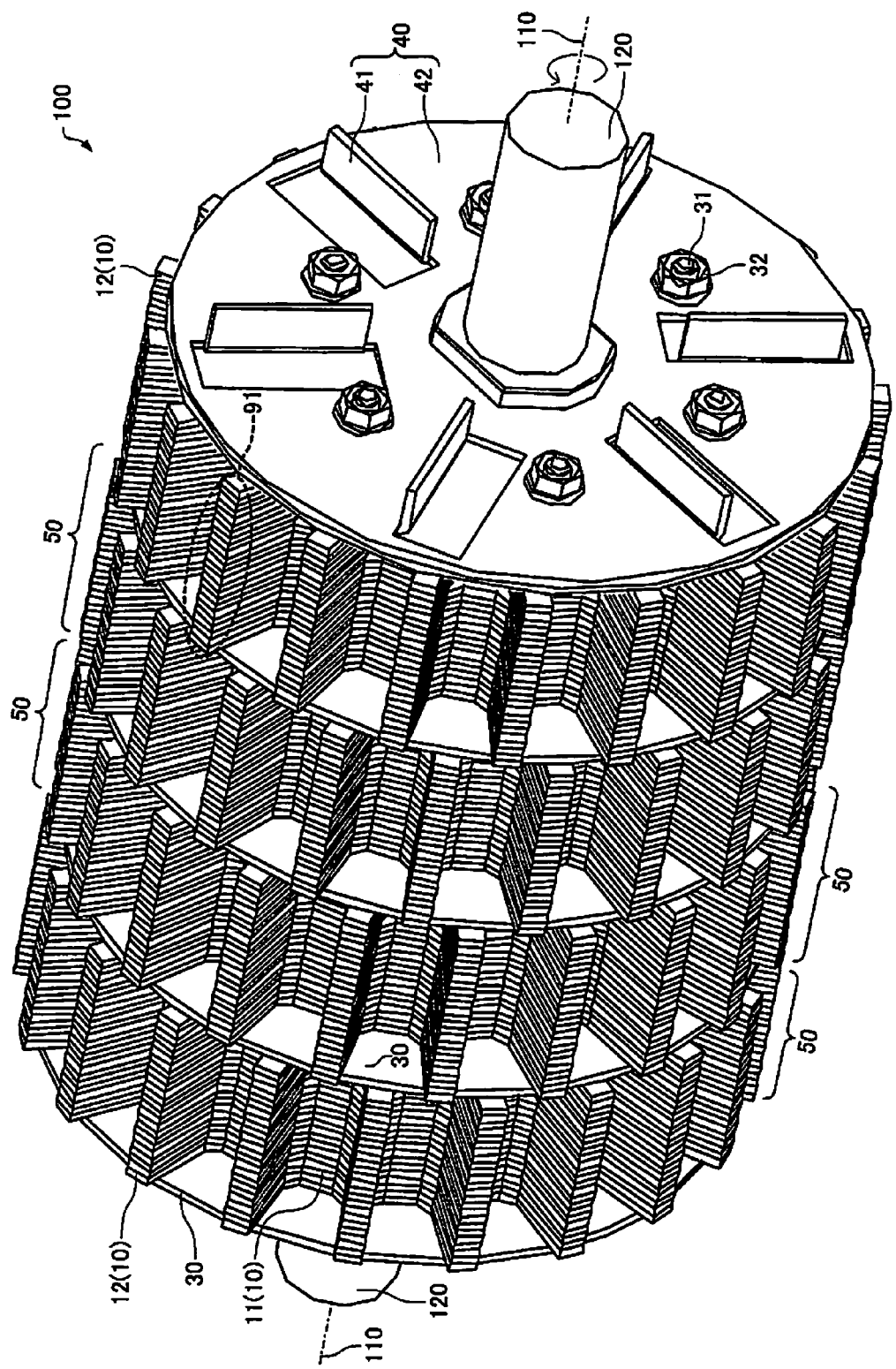
FIG. 5 is a schematic diagram illustrating a rotating unit according to an embodiment.
Figure 6:
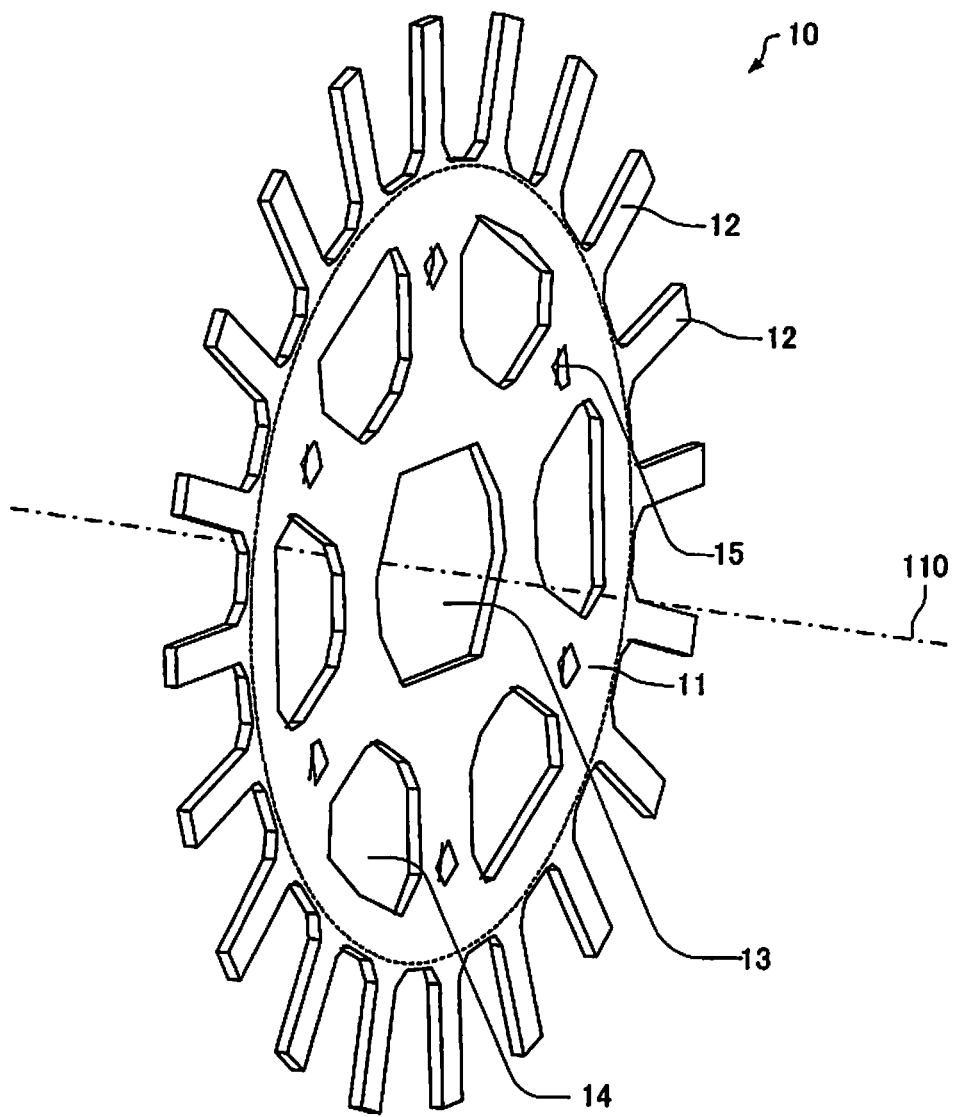
FIG. 6 is a schematic diagram illustrating a rotating plate according to an embodiment.
Figure 7:
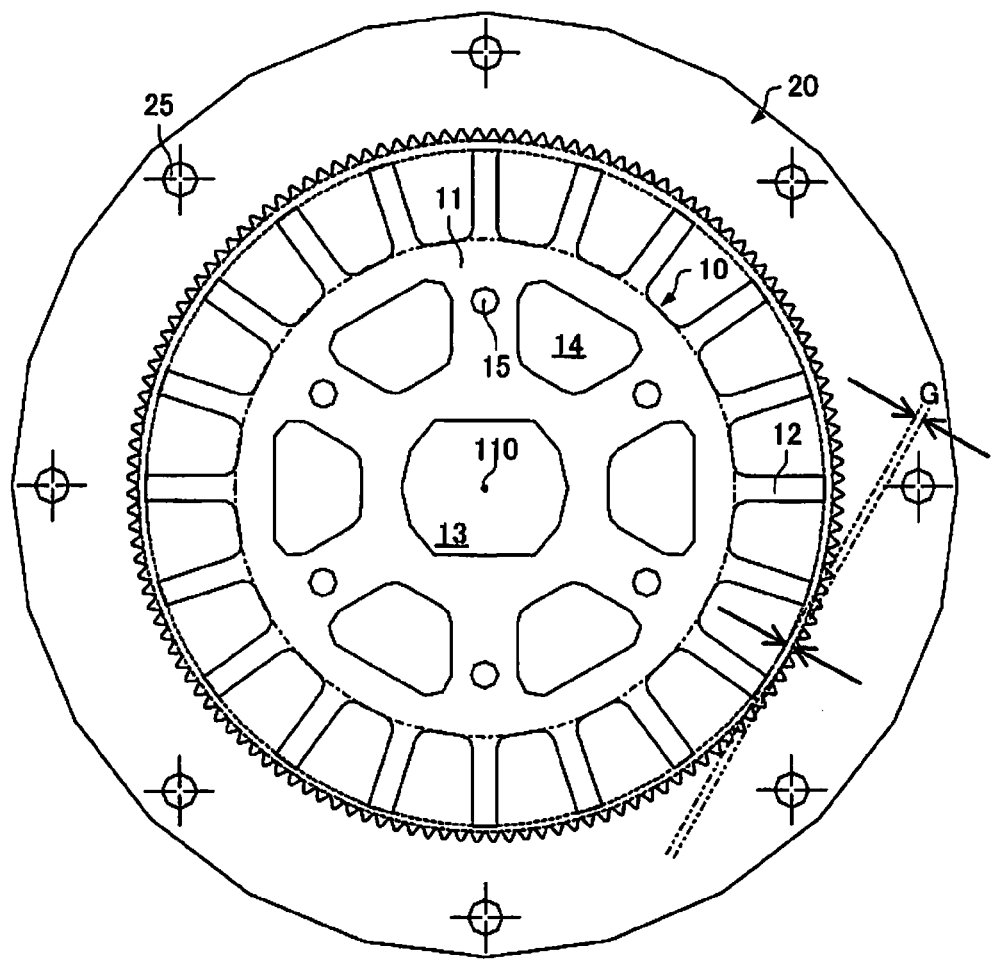
FIG. 7 is a schematic diagram illustrating a rotating plate and a fixing plate according to an embodiment in a planar view.
Figure 8:
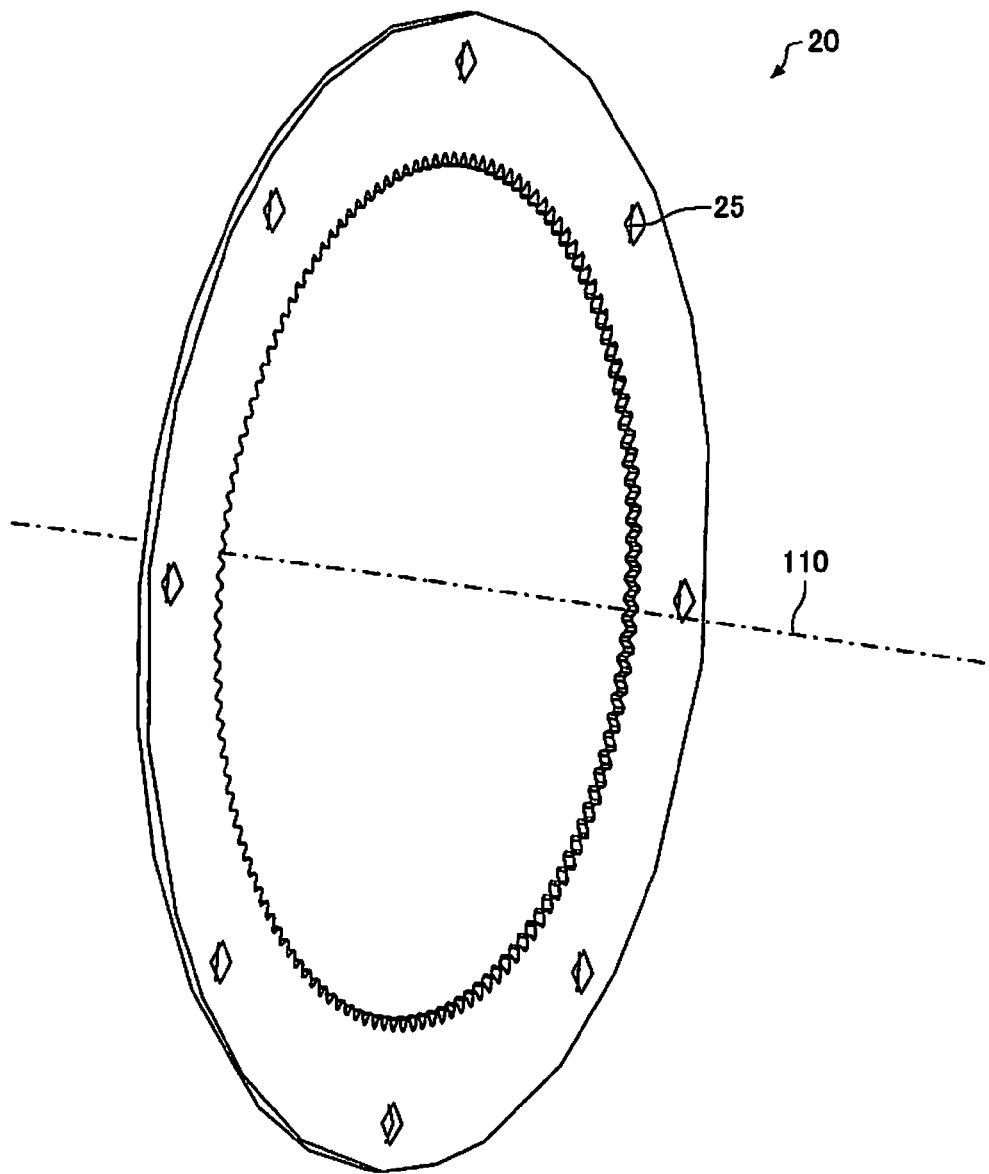
FIG. 8 is a schematic diagram illustrating a fixing plate according to an embodiment.
Figure 9:
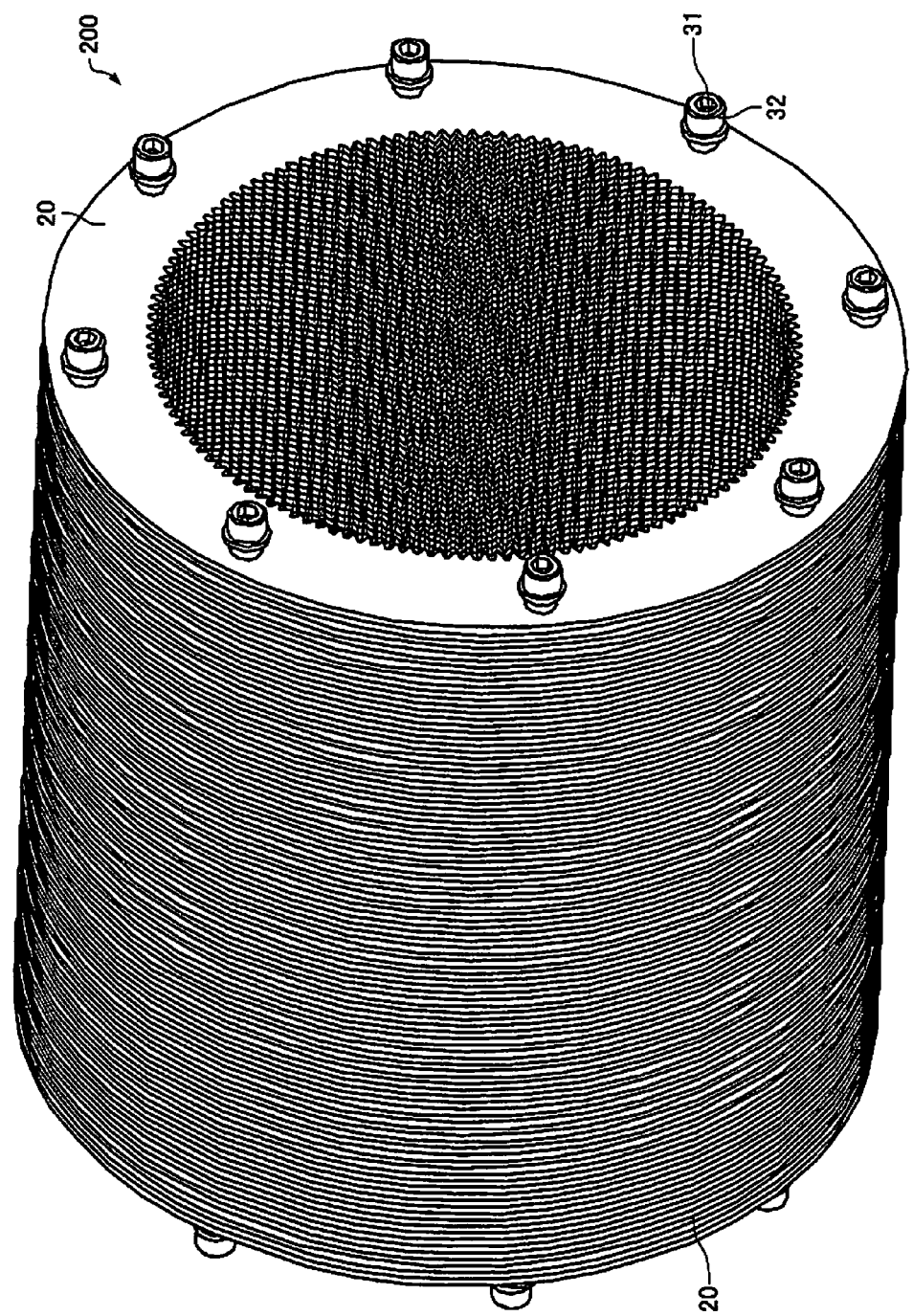
FIG. 9 is a schematic diagram illustrating a fixing unit according to an embodiment.
Figure 10:
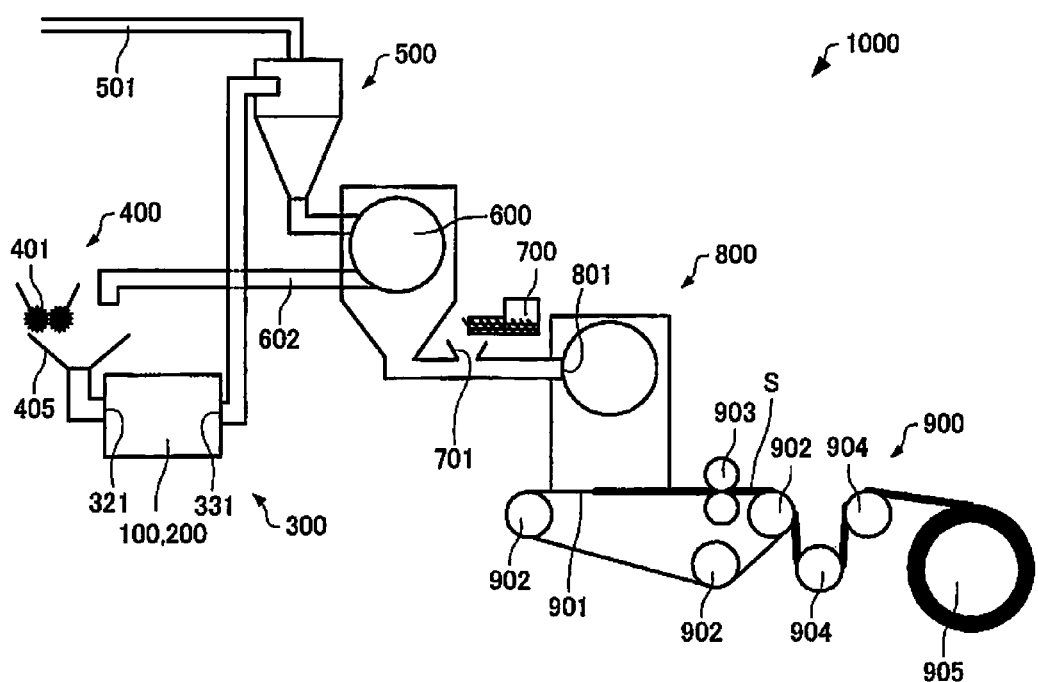
FIG. 10 is a diagram schematically illustrating a sheet manufacturing apparatus according to an embodiment.

FIG. 1 is a schematic diagram illustrating a partial cross section of a defibrating unit 300. FIGS. 2A to 2D are schematic diagrams illustrating a rotating unit 100 viewed from the extending direction of a central rotation axis 110. FIG. 3 and FIG. 4 are schematic diagrams illustrating a main portion of the defibrating unit 300 viewed from a direction which is orthogonal to the central rotation axis 110. FIG. 5 is a schematic diagram illustrating the rotating unit 100. FIG. 6 is a schematic diagram illustrating a rotating plate 10. FIG. 7 is a schematic diagram illustrating the rotating plate 10 and a fixing plate 20 in a planar view. FIG. 8 is a schematic diagram illustrating the fixing plate 20. FIG. 9 is a schematic diagram illustrating a fixing unit 200. FIG. 10 is a diagram schematically illustrating the sheet manufacturing apparatus 1000 according to the present embodiment.

In the present specifications, defibration object refers to material where fibers are entangled or bonded such as pulp sheets, paper, used paper, nonwoven materials, fiber board, tissue paper, kitchen paper, cleaning paper, filters, liquid absorbing materials, sound absorbing bodies, shock absorbing materials, or mats. Natural fibers (animal fibers and plant fibers), chemical fibers (organic fibers, inorganic fibers, organic and inorganic composite fibers), and the like can be given as examples of the fibers. In more detail, examples include fibers which are formed from cellulose, silk, wool, cotton, hemp, kenaf, flax, ramie, jute, Manila hemp, sisal, softwood, and hardwood and fibers which are formed from rayon, lyocell, cupra, vinylon, acrylic, nylon, aramid, polyester, polyethylene, polypropylene, polyurethane, polyimide, carbon, glass, and metal, and the defibration object may be include a single type of fiber or may be a combination of a plurality of types of fibers.

In addition, in the present specifications, dry type has the meaning of in air and not in water. The scope of dry type includes a dry state and a state where there is liquid as an impurity or there is liquid which is intentionally added.

1.1 Defibrating Unit

The sheet manufacturing apparatus 1000 according to the present embodiment includes the defibrating unit 300 as illustrated in FIGS. 1 and 10. The defibrating unit 300 of the sheet manufacturing apparatus 1000 according to the present embodiment has a rotor 90 and a feeding blade 40. The rotor 90 and the feeding blade 40 are a portion of the configuration of a rotating unit 100 of the defibrating unit 300.

The defibrating unit 300 carries out a dry-type defibrating process on defibration object. The defibrating unit 300 creates fibers which are untangled into a fibrous form by carrying out defibrating on the defibration object. Here, the "defibrating process" refers to a process with the aim of individual fibers in the defibration object, where a plurality of fibers are bonded together, being untangled. In addition, material which passes through a gap G (which will be described later) of the defibrating unit 300 is referred to "defibrated material" in the present specifications.

As shown in FIG. 1 to FIG. 5, the defibrating unit 300 of the present embodiment has the rotating unit 100 which is configured to include the rotor 90 and the feeding blade 40. In addition, as shown in FIG. 1, the defibrating unit 300 of the present embodiment includes the fixing unit 200 and is configured so that the rotating unit 100 rotates at the inner side of the fixing unit 200 around a rotating shaft 120.

1.1.1 Rotating Unit

The rotating unit 100 includes the rotor 90 and the feeding blade 40. It is possible for the rotor 90 to rotate around the central rotation axis 110 and a plurality of protuberances 91 for defibrating are provided around the outside of the rotor 90 centered on the central rotation axis 110. The rotor 90 is not particular limited as long as it is possible to contribute to an action of defibrating the defibration object. The rotor 90 has the rotation shaft 120 and it is possible for the rotor 90 to be configured from a single member or a plurality of members.

Each member of the defibrating unit 300 of the present embodiment will be described in order below.

Rotor

The rotor 90 includes a plurality of rotating plates 10. The number of the rotating plate 10 of the rotor 90 is not limited as long as there are a plurality of the rotating plates 10. As shown in FIG. 1 and FIG. 5, the rotor 90 has a structure where at least two of the plurality of rotating plates 10 come into contact and are layered with regard to the rotation shaft 120 in a direction in which the rotation shaft 120 extends. Here, all of the rotating plates 10 need not come into contact and be layered in the rotor 90.

The rotating plates 10 are members with a plate shape as shown in FIGS. 6 and 7 and are provided with a base section 11 which is positioned on the central rotation axis 110 side and a plurality of protruding sections 12 which protrude from the base section 11 in a direction to be further from the central rotation axis 110. The central rotation axis 110 is positioned centrally when the rotor 90 is rotated and is a virtual line which passes through the vicinity of the center of gravity of the rotating plates 10. It is preferable that the rotating plates 10 are formed so that there is balance of the weight with regard to the central rotation axis 110 in order for the rotating plates 10 to rotate around the central rotation axis 110 using the rotation shaft 120.

The base section 11 of the rotating plate 10 has an engaging hole 13 which engages with the rotation shaft 120 as shown in the diagram so that it is possible for the rotating plate 10 to rotate along with the rotating of the rotation shaft 120. In addition, the base section 11 has a plurality of reduced material sections 14 for reducing the weight of the rotating plate 10. In addition, a plurality of bolt holes 15 are formed in the base section 11 in order for a plurality of the rotating plates 10 to be held in a state of being layered.

The protruding sections 12 of the rotating plates 10 are protuberances with substantially square shapes in a planar view as shown in the diagram (refer to FIG. 7) and protrude in a radial formation from the central rotation axis 110 to the outside. The number of protruding sections 12 is not particularly limited as long as there is no loss of performance in the defibrating process. In the example which is shown in FIGS. 6 and 7, 20 of the protruding sections 12 are provided in the rotating plate 10 with equal spacing.

In addition, in the example in the diagrams, 6 of the reduced material sections 14 and 6 of the bolt holes 15 are formed in the base section 11 of the rotating plate 10, but it is sufficient if an appropriate number of the reduced material sections 14 and the bolt holes 15 are provided according to requirements. In addition, the base section 11 has a substantially circular shape in a planar view as shown in the example in the diagrams, but the base section 11 may have a polygonal shape or a shape which includes curves. In addition, although not shown in the diagrams, protuberances or guides may be formed in order for positioning with regard to members which are layered onto the rotating plates 10 (which include the adjacent rotating plates 10), and the protuberances or the guides may protrude in the thickness direction of the rotating plates 10.

The thickness of the rotating plates 10 is not particularly limited. The thickness of the protruding sections 12 may be the same from the base section 11 side to the tip end. The base section 11 and the protruding sections 12 of the rotating plate 10 may be integrally formed or may be separately formed, and the protruding sections 12 may be arranged so as to protrude from the base section 11 using an appropriate means. Here, in the present specifications, the thickness of the rotating plate 10 (which includes the base section 11 and the protruding sections 12) refers to the dimension of the rotating plate 10 in a direction in which the rotation shaft 120 extends.

It is possible for examples of the material for the rotating plates 10 to include stainless steel, high hardness steel, ceramics, ultrahard alloys, precipitation hardening stainless material, and the like. In addition, the base section 11 and the protruding sections 12 may be formed from materials which are different to each other. In addition, after being formed using predetermined materials, a process where the surfaces of the rotating plates 10 are hardened may be carried out through a gas oxidation process, plating, or the like. Furthermore, the hardening process may be performed after each of the plates is layered. By doing this, it is possible to reduce the materials which are used in the hardening process. It is possible for the rotating plates 10 to be formed by punching out cold rolled steel, steel strips (SPCC, SPCD, SPCE, SPCF, SPCG), or the like using a press.

It is possible for the size of the rotating plates 10 to be appropriately determined depending on the processing performance of the defibrating unit 300 or the like. In addition, the size of the base section 11, the length by which the protruding sections 12 protrude from the base section 11, and the like are not particularly limited. Here, the distance from the central rotation axis 110 to the tip end of the protruding sections 12 is the same for the plurality of protruding sections 12. Due to this, it is possible for the size of the gap with the fixing unit 200 (the gap G which will be described later) to be maintained to be substantially constant over the entire circumference of the rotating plate 10 since the tip ends of each of the protruding sections 12 trace out trajectories which are substantially the same circle when the rotor 90 is rotated. The rotor 90 has a structure where the protruding sections 12 of the rotating plates 10 are layered in a direction in which the rotation shaft 120 extends.

The rotor 90 has a structure where the protruding sections 12 of the rotating plates 10 are layered in a direction in which the rotation shaft 120 extends. This structure configures the plurality of protuberances 91 for defibrating. Due to the protuberances 91, it is possible to contribute to the effect of generating a flow of air and untangling the defibration object which is introduced into the defibrating unit 300, an effect of hitting (smashing) the defibration object, and the like in a case where the rotating unit 100 is rotated.

The rotor 90 has the rotation shaft 120 which is orthogonal with regard to the flat surface of the rotating plates 10. It is possible for the rotation shaft 120 to rotate around the central rotation axis 110 due to an outside driving mechanism such as a motor which is not shown in the diagrams. Due to rotating of the rotation shaft 120, it is possible to rotate the rotating plates 10. The rotation shaft 120 has an out diameter shape in the diagrams so that it is possible to engage with regard to the engaging holes 13 of the rotating plates 10.

The size of the rotor 90 in a direction along the rotation shaft 120 is not particularly limited in a range where it is possible to carry out an action where the defibration object is introduced into the defibrating unit 300 and the defibration object is defibrated in a case where the rotor 90 is rotated. It is possible for the size of the rotor 90 in a direction along the rotation shaft 120 to be adjusted according to changes in the thickness, the number of layerings, and the like of the rotating plates 10.

As shown in FIGS. 1 and 5, the rotor 90 is configured so that there are step sections 50 with four steps where 24 of the rotating plates 10 are layered and five partition plates 30 are layered between and on both ends of each of the step sections 50. In this example, all of the rotating plates 10 have the same shape and the same thickness. In addition, here, the protruding sections 12 of the rotating plates 10 which configure one of the step sections 50 are layered substantially without deviating in the circumference direction and each of the protruding sections 12 in the adjacent step sections 50 are arranged so deviate in the circumference direction. In addition, the partition plates 30 are arranged between the adjacent step sections 50. As a result, the protruding sections 12 in each of the step sections 50 are layered so as to come into contact and the protruding sections 12 at a portion, where the partition plates 30 are arranged, are arranged so as to not come into contact. It is possible for the material of the partition plates 30 to be the same as the rotating plates 10.

Feeding Blade

The feeding blade 40 is provided on one of the side sections of the rotor 90. Here, the side section refers to an end section of the rotor 90 in a direction in which the central rotation axis 110 (the rotation shaft 120) extends (extending direction). Accordingly, the side sections of the rotor 90 are in two locations. Out of the side section at the two locations, the feeding blade 40 is provided at the side section on the side where the defibration object is introduced with regard to the defibrating unit 300. In other words, the feeding blade 40 is provided on the rotor 90 at the side section on the input section side for the defibration object. The input section is a portion which refers to a configuration where the defibration object is introduced with regard to the defibrating unit 300 and which is on the side where an input pipe 320 is arranged. Accordingly, the defibration object is introduced in the vicinity of the feeding blade 40 when introduced from the input pipe 320 into the defibrating unit 300.

The feeding blade 40 has a blade section 41 which stands up in the extending direction of the central rotation axis 110 of the rotor 90. Since the blade section 41 has a shape which protrudes toward the input pipe 320 side when viewed from the rotor 90, air is fanned by the blade section 41 when the rotor 90 rotates and a flow of air is generated. The shape, inclination when standing up, the size, and the like of the blade section 41 is not limited as long as a surface is formed which progresses in the circumference direction when the rotating unit 100 is rotated. In addition, it is possible to appropriately adjust the inclination when the blade section 41 is standing up so that it is possible to generate a desired flow of air. In addition, in a case such as where the blade section 41 is a plate shape, the plate may be curved or bent. Appropriate settings are possible so that it is possible for a desired flow of air to be generated where the shape of the surface of the blade section 41 which generates the flow of air is either a polygonal shape or an irregular shape which is partitioned by a straight line or a curved line.

It is possible for the feeding blade 40 to be configured from a blade plate 42 and the blade section 41. In this case, the blade section 41 may be configured by a portion of the blade plate 42 being bent so as to stand up. In addition, the blade section 41 may be formed by a side section of the rotor 90 directly standing up. In this case, the feeding blade 40 is configured by the blade section 41 (to include a joining portion such as an adhesive). The number of blade sections 41 in the feeding blade 40 is not limited. In a case where a plurality of the blade sections 41 are provided, it is preferable that the plurality of blade sections 41 are arranged symmetrically with regard to the central rotation axis 110.

In the example in FIGS. 1 and 5, the feeding blade 40 is provided on the rotor 90 at the side section on the side where the input pipe 320 is arranged and is configured from the blade plate 42 and the blade section 41. Then, in this example, the blade plates 42 are provided in six locations to be bend substantially at right angles and are set as six of the blade sections 41, and are arranged in a radial formation from the central rotation axis 110 in a case where each of the blade sections 41 are viewed from a direction along the central rotation axis. It is possible for the material of the feeding blade 40 to be the same as for the rotating plates 10.

FIGS. 2A to 2D are schematic diagrams of the rotating unit 100 viewed from the extending direction of the central rotation axis 110 and are schematic diagrams illustrating various aspect of the blade section 41. In the example shown in FIG. 2A, the blade sections 41 are exemplified as the blade sections 41 with a flat plate shape along lines which extend from the central rotation axis 110 in a radial formation. In the example shown in FIG. 2B, the blade sections 41 are exemplified as the blade sections 41 where a surface of the blade section 41 with a flat plate shape has an inclination with regard to a direction along lines which extend from the central rotation axis 110 in a radial formation. In this example, each of the blade sections 41 are provided to be inclined in a specific direction but are not limited to this, and it is possible for the angle of inclination and the direction of inclination to be arbitrarily set for each of the blade sections 41. In addition, in the examples of FIG. 2A and FIG. 2B, the blade sections 41 are examples where a cut out portion of the blade plate 42 is bent by 90 degrees in a direction along the rotation shaft 120 and the feeding blade 40 is formed from the blade plates 42 and the blade sections 41.

Figure 2A:
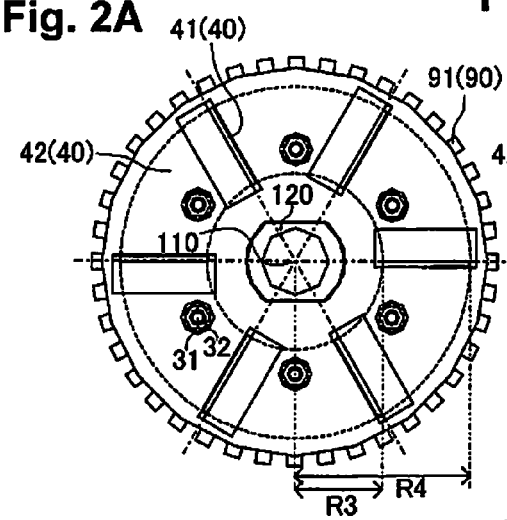
FIG. 2A is a schematic diagram illustrating a rotating unit according to an embodiment viewed from the extending direction of a central rotation axis.
Figure 2B:
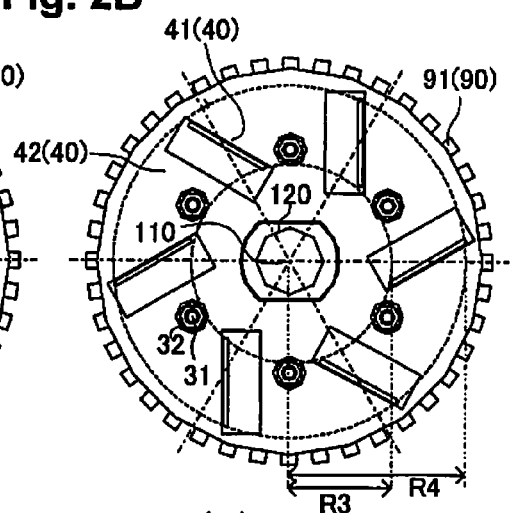
FIG. 2B is a schematic diagram illustrating the rotating unit according to the embodiment viewed from the extending direction of the central rotation axis.
Figure 2C:
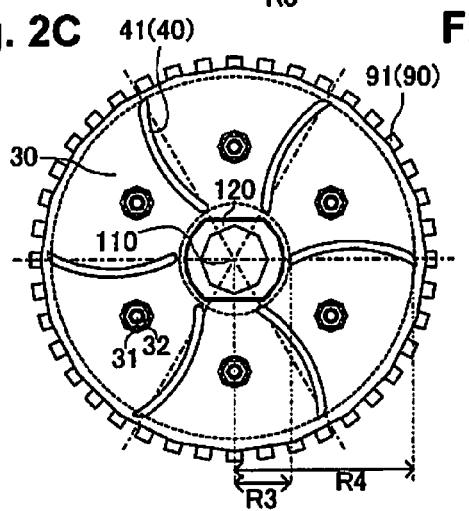
FIG. 2C is a schematic diagram illustrating the rotating unit according to the embodiment viewed from the extending direction of the central rotation axis.
Figure 2D:
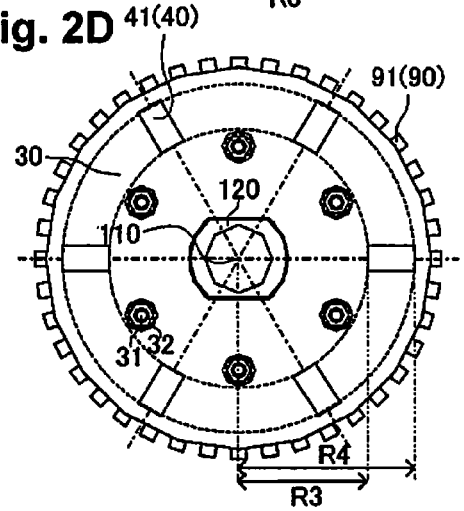
FIG. 2D is a schematic diagram illustrating the rotating unit according to the embodiment viewed from the extending direction of the central rotation axis.

In the example shown in FIG. 2C, the blade sections 41 are exemplified as the blade sections 41 which are formed along lines which extend from the central rotation axis 110 in a radial formation and which are formed in a shape of a plate which is curved. In the example shown in FIG. 2D, the blade sections 41 are exemplified as the blade sections 41 which are formed along lines which extend from the central rotation axis 110 in a radial formation and which are formed in a shape of a (rectangular) thick plate. In addition, in the examples in FIG. 2C and FIG. 2D, the blade sections 41 are examples where the blade section 41 is joined to the partition plate 30 and the feeding blade 40 is formed from the blade sections 41. In addition, the blade sections 41 are joined to the partition plate 30 in this example, but the blade sections 41 may be joined to the base section 11 of the rotor 90. As in the examples in FIG. 2C and FIG. 2D, the feeding blade 40 (the blade section 41) may be attached with regard to the base section 11 in a case where the rotor 90 is formed from the base section 11 on the side which is close to the central rotation axis 110 and the plurality of protruding sections 12 which protrude from the base section 11 in a direction to be further from the central rotation axis 110, and due to this, it is easy to feed the defibration object with regard to the direction of the rotor 90 (the gap G) since there is no gap between the rotor 90 and the feeding blade 40.

In each of the examples shown in FIGS. 2A to 2D, six of the blade sections 41 are provided but the number of the blade sections 41 is not limited. In addition, the rotating direction of the rotor 90 in each of the examples shown in FIGS. 2A to 2D may be clockwise or counterclockwise in FIGS. 2A to 2D. It is possible to appropriately set the number, shape, and arrangement of the blade sections 41 and the rotating direction of the rotor 90 so that it is possible to generate a desired flow of air.

The feeding blade 40 has an action where it is possible to generate a centrifugal force and/or a flow of air by rotating and the defibration object is feed in the direction of the rotor 90. In addition, the feeding blade 40 has an action where it is easy for defibration object to be defibrated by being hit using the feeding blade 40. That is, the defibration object is crushed by the feeding blade 40 before progressing into the gap G and is in a state where it is easier to defibrate. Furthermore, the feeding blade 40 has an action where deviations in supply of the defibration object with regard to the entire circumference of the rotor 90 is suppressed since the defibration object which is input from the input section (the input pipe 320) is mixed up.

Here, various dimensions of the rotor 90, the feeding blade 40, and the defibrating unit 300 will be defined with reference to FIG. 2A to FIG. 4. As shown in FIG. 2A to FIG. 4, R1 is a distance from the central rotation axis 110 to a trajectory which is drawn in a case of rotating the tip end of the protuberances 91 for defibrating in the rotor 90. R2 is a distance from the central rotation axis 110 to a trajectory which is drawn in a case of rotating the tip end of a portion which excludes the protuberances 91 for defibrating (the base section) in the rotor 90. R3 is a distance from the central rotation axis 110 to a trajectory which is drawn in a case of rotating the tip end of the blade section 41 at a side which is close to the central rotation axis 110. R4 is a distance from the central rotation axis 110 to a trajectory which is drawn in a case of rotating the tip end of the blade section 41 at a side which is far from the central rotation axis 110. R5 is a distance from the central rotation axis 110 to a trajectory which is drawn in a case of rotating the tip end of the blade plate 42 in a case where the feeding blade 40 is configured to include the blade plate 42.

Furthermore, T is the thickness of the blade plate 42 (which is the same as the thickness of the blade section 41) in a case where the feeding blade 40 is configured to include the blade plate 42. D1 is the maximum length (height when standing) of the blade section 41 in the extending direction of the central rotation axis 110. That is, D1 is the distance between the base of the blade section 41 and a portion of the blade section 41 which is closest to the input pipe 320 of the defibrating unit 300. D2 is the distance between the tip end of the blade section 41 and a position, which is closest to the rotor 90, in an input opening 321 of the input pipe 320 of the defibrating unit 300. R6 is a distance from the central rotation axis 110 to a position, which is closest to the rotor 90, in the input opening 321 of the input pipe 320 of the defibrating unit 300.

Here, the input opening 321 of the input pipe 320 is a shape where the input pipe 320 is cut away with a flat surface which is parallel to the central rotation axis 110 in the example in the diagrams but the shape is not limited to this, and the shape may be inclined with regard to the central rotation axis 110 and may be a shape which is cut away with a curved surface. Even in these cases, it is possible to define R1 to R6, D1, and D2 in the same manner. In addition, the input pipe 320 may be introduced to be parallel or inclined with regard to the central rotation axis 110. In addition, when the input pipe 320 is introduced at right angles to the central rotation axis 110 as shown in the diagrams, the input pipe 320 may be bent towards the feeding blade 40. Even in this case, it is possible to define R1 to R6, D1, and D2 in the same manner.

In a case where the feeding blade 40 of the rotating unit 100 is configured using the blade plates 42 and the blade sections 41, the size of the feeding blade 40 from the central rotation axis 110 may be larger than the base section 11 of the rotor 90 and may be smaller than the protruding sections 12 (the protuberances 91 for defibrating). That is, when referencing FIG. 3, R5 may be larger than R2 and may be smaller than R1 in a case where the feeding blade 40 has the blade plates 42. By doing this, it is possible to further increase the action of the defibration object progressing into the gap G from the side which is further from the central rotation axis 110 than the circular trajectory which is drawn by the base section 11 using rotating of the feeding blade 40. In addition, in this case, it is possible to maintain a sufficient defibrating effect since the size of the feeding blade 40 from the central rotation axis 110 is smaller than the protruding sections 12 (the protuberances 91 for defibrating).

The rotating unit 100 of the defibrating unit 300 of the present embodiment is fastened (fixed) together with the rotor 90 which is formed from the rotating plates 10 and the partition plates 30 along with the feeding blade 40 (the blade plates 42 and the blade sections 41) using a bolt 31 and a nut 32. By doing this, it is possible to reduce the number of members for fixing and the like when the rotor 90 is provided with the feeding blade 40.

In addition, in a case where the feeding blade 40 is configured by the blade plates 42 and the blade sections 41 and an opening which for reducing the use of materials or the like is provided in the rotor 90, the blade plates 42 may close off the opening instead of the opening being closed off by the partition plates 30. By doing this, it is possible that the defibration object does not enter into the opening in the rotor 90 and it is possible to reduce the weight of the rotating unit 100 since it is possible to reduce the number of the partition plates 30.

1.1.2. Fixing Unit

The defibrating unit 300 of the present embodiment has the fixing unit 200. The fixing unit 200 is arranged to be separated with regard to the rotating unit 100 in a direction to be further from the central rotation axis 110. The surface of the fixing unit 200 on the central rotation axis 110 side has concavities and convexities in the circumference direction of the rotating unit 100.

The fixing unit 200 may be configured as a single member or may be configured as a plurality of members. As shown in FIGS. 1 and 9, the fixing unit 200 of the present embodiment is formed using a plurality of fixing plates 20. The fixing plates 20 are members with a plate shape and have a ring shape in a planar view as shown in FIGS. 7 and 8. The concavities and convexities are formed on a surface on the inner side of the ring of the fixing plates 20 by protruding in a direction from a portion of the ring shape toward the central rotation axis 110 in a planar view. The concave and convex sections are formed with equal spacing and the distance between the tip ends of each of the convex sections (on the central rotation axis 110 side) and the central rotation axis 110 is the same. In the same manner, the distance between the bottom sections of each of the concave sections (on the side which is separated from the central rotation axis 110) which are between each of the convex sections and the central rotation axis 110 is the same. Then, as shown in FIG. 7, a plane which envelopes the surface on the inner side of the fixing plate 20 is to the outside of the plane of the trajectory which is drawn when the protruding sections 12 of the rotating plates 10 are rotated when viewed from the central rotation axis 110. In other words, the radius of the circle which is inscribed on the surface on the inner side of the fixing plate 20 is larger in a planar view than the radius of the circle which is drawn when the protruding sections 12 of the rotating plates 10 are rotated.

In the present specifications, the distance in a planar view, when the radius of the circle which is drawn when the protruding sections 12 of the rotating plates 10 are rotated is subtracted from the radius of the circle which is inscribed on the surface on the inner side of the fixing plate 20, is referred to as the gap G (refer to the reference numeral G in FIGS. 2A to 2D, 3, 7, and the like).

The plane which envelopes the surface on the inner side of the fixing plate 20 is a circular shape in a planar view and it is preferable that the center of the circle match to be combined with the central rotation axis 110 of the rotating unit 100 in consideration of errors. By doing this, it is possible to more stably perform the defibrating process since the size of the gap G which is formed by the rotating unit 100 and the fixing unit 200 is large and does not differ in the circumference direction of the rotation shaft 120.

A plurality of bolt holes 25 are formed in the fixing plate 20 in order for the fixing plate 20 to be held in a state where a plurality of the fixing plates 20 are layered as shown in FIGS. 7 and 8. Here, eight of the bolt holes 25 are formed in the fixing plate 20, but an appropriate number of the bolt holes 25 may be provided due to requirements and there are cases where the bolt holes 25 are not necessary in a case where the fixing plates 20 are layered using another means.

The shape of the outer side of the fixing plates 20 have a shape which is substantially circular in a planar view in the diagrams but the outer side of the fixing plates 20 may have a polygonal shape or a shape which includes curves. There are cases where it is possible for air cooling of the defibrating unit 300 to be promoted when the shape of the outer side of the fixing plates 20 has concavities and convexities. In addition, although not shown in the diagram, protuberances or guides may be formed in order for positioning with regard to members which are layered onto the fixing plates 20 (which include the adjacent fixing plates 20), and the protuberances or the guides may protrude in the thickness direction of the fixing plates 20.

The thickness of the fixing plates 20 is not particularly limited. The thickness of the fixing plates 20 and the rotating plates 10 may be the same or may be different. In a case where the thickness of the fixing plates 20 and the thickness of the rotating plates 10 is the same, it is possible for dimensional accuracy and productivity to be improved since it is possible to manufacture the fixing plates 20 and the rotating plates 10 at the same time when manufacturing the fixing plates 20 and the rotating plates 10 by press punching from the same raw material (for example, steel plates). In particular, it is possible to improve the dimensional precision of the gap. Here, in the present specifications, the thickness of the fixing plate 20 refers to the dimension of the fixing plate 20 in a direction in which the rotation shaft 120 extends in a case of being arranged with the rotating unit 100.

The material of the fixing plates 20 is the same as the rotating plates 10. It is possible for the size of the fixing plates 20 to be appropriately determined according to the processing performance of the defibrating unit 300, design of the gap G between the rotating plates 10 and the fixing plates 20, and the like.

The fixing plates 20 are layered in the fixing unit 200 so that the adjacent fixing plates 20 come into contact in a direction in which the rotation shaft 120 extends. In FIG. 9, 101 of the fixing plates 20, which are formed with the same thickness as the rotating plates 10, are layered so as to come into contact.

The number of the fixing plates 20 of the fixing unit 200 of the present embodiment is not limited as long as there is a plurality of the fixing plates 20. The number of the fixing plates 20 may be the same or may be different to the number of the rotating plates 10. In the present embodiment, the fixing unit 200 has a structure where a plurality of the fixing plates 20 are layered so as to come into contact in a direction in which the rotation shaft 120 extends with regard to the rotation shaft 120 of the rotating unit 100. As a result, as shown in FIG. 9, the fixing unit 200 is a shape of a straight pipe (tube) so that there is a central shaft at an inner surface with concavities and convexities.

The fixing plates 20 are layered so that the concavities and convexities on the inner side which are formed in each of the adjacent fixing plates 20 come into contact with each other when the fixing plates 20 are layered. As a result, concavities and convexities are formed in the circumference direction on the surface of the fixing unit 200 on the central rotation axis 110 side (inner surface) due to the concavities and convexities which belong to each of the fixing plates 20 which are layered. Here, the shape and size of the concavities and convexities are not particularly limited and are appropriately set in combination with the sheets which are being manufactured.

The concavities and convexities, which are formed on the surface of the fixing unit 200 on the central rotation axis 110 side, have a function of generating a flow of air so that the defibration object which progresses into the gap G is untangled in a case where the rotating unit 100 is rotated in the fixing unit 200. In a case where the rotating unit 100 is rotated in the fixing unit 200, the defibration object is defibrated using a flow of air due to a flow of air being generated when the protruding sections 12 pass in the vicinity of the concave sections of the concavities and convexities and rotate in the concave sections when viewed from the central rotation axis 110 side.

The shape of the concavities and convexities which are formed on the inner surface of the fixing unit 200 and the shape of the concavities and convexities which are formed on each of the fixing plates 20 are arbitrary as long as contribution to the action as described above is possible. In addition, the unevenness of the concavities and convexities which are formed on the inner surface of the fixing plates 20 is not particularly limited, the concavities and convexities may be substantially flat and the fixing plates 20 such as this may be layered with the fixing plates 20 with concavities and convexities which are more uneven, and the ordering of the layering of the fixing plates 20 in this manner is not limited.

The size of the fixing unit 200 in a direction along the rotation shaft 120 (the central rotation axis 110) is not particularly limited in a range where it is possible to carry out an action where the defibration object is introduced into the defibrating unit 300 and the defibration object is defibrated in a case where the rotating unit 100 is rotated. It is possible for the size of the fixing unit 200 in a direction along the rotation shaft 120 to be adjusted according to changes in the thickness, the number of layerings, and the like of the fixing plates 20. In addition, the size of the fixing unit 200 in a direction along the rotation shaft 120 may be the same as or may be different to the size of the rotating unit 100 in a direction along the rotation shaft 120.

As shown in FIG. 9, the fixing unit 200 of the present embodiment is configured by 101 of the fixing plates 20 with the same thickness and the same shape being layered. Then, the rotating plates 10 (24×4 (step sections)=96) which configure the rotor 90 of the rotating unit 100 and the partition plates 30 (5) are layered with the same thickness. Accordingly, the number of the fixing plates 20 which are layered in the fixing unit 200 and the number of the members which are layered in the rotor 90 is the same and the thicknesses are also the same. As a result, the sizes of the rotor 90 and the fixing unit 200 in a direction along the rotation shaft 120 are the same as each other. In the fixing unit 200, the fixing plates 20 are fastened together using the bolt 31 and the nut 32.

1.1.3. Structure of Defibrating Unit

The defibrating unit 300 of the present embodiment has the rotating unit 100 described above and the fixing unit 200 described above as shown in FIG. 1. In FIG. 1, the fixing unit 200 is drawn as a cross section and the convexities and the convexities on the inner side surface are omitted. The rotating unit 100 is arranged in the space on the inner side of the fixing unit 200 and is supported in the fixing unit 200 by the rotation shaft 120.

It is possible for the rotating shaft 120 to be suspended at both ends by bearings which are not shown in the diagrams and to freely rotate using a driving mechanism which is not shown in the diagrams. As the driving mechanism, examples include a mechanism where the rotation shaft 120 is directly rotated using a motor, a mechanism where the rotation shaft 120 is rotated via a power transmission mechanism such as a belt and pulley, a chain and sprocket, or gears, and the like.

In addition, a cover 310 is provided in the defibrating unit 300 in FIG. 1 on both end sides in a direction in which the rotation shaft 120 extends. Here, the cover 310 forms a space which is closed off both end sides of the fixing unit 200 in a direction in which the rotation shaft 120 extends in a state where it is possible for the rotation shaft 120 to pass through and where the defibration object and defibrated material is accommodated within. The size of the space is not particularly limited. In addition, here, the input pipe 320 and an output pipe 330, which link up the space which is formed by the cover 310, are provided. Furthermore, here, the feeding blade 40 is attached to an end section of the rotor 90 on the side of the input pipe 320 in a direction along the rotation shaft 120, and the blade sections 41, where a portion of the blade plates 42 which configure the feeding blade 40 stand up in a direction along the rotation shaft 120, are provided.

The input pipe 320 is a pipe for introducing the defibration object into the defibrating unit 300 and the output pipe 330 is a pipe for discharging the defibrated material, which is defibrated using the rotating unit 100 (the rotor 90) of the defibrating unit 300, from the defibrating unit 300. The input pipe 320 is the input section for the defibration object into the defibrating unit 300.

The feeding blade 40 has an action of moving the defibration object or the defibrated material from the input pipe 320 side to the output pipe 330 side. In addition, either or both of the input pipe 320 side to the output pipe 330 side may be provided with an air blowing mechanism such as a blower or an air sucking mechanism in an auxiliary manner.

In the example in FIG. 1, the input opening 321 which is at the tip end of the input pipe 320 is in the vicinity of the rotation shaft 120 and an output opening 331 which is at the tip end of the output pipe 330 is at a position which is further from the rotation shaft 120. That is, the input pipe 320 is positioned on the central rotation axis 110 side of the outermost trajectory, which is possible when the blade sections 41 are rotated, in a direction which is orthogonal to the central rotation axis 110. The arrangement of the input pipe 320 is such that R6 is the same as R4 or smaller than R4 when referencing FIGS. 3 and 4. When the input pipe 320 is arranged in this manner, the defibration object is introduced into the inner side of the trajectory of the outermost portion of the blade sections 41. As a result, it is easy for the defibration object to be dispersed in a radial formation from the central rotation axis 110 to the outside due to a centrifugal force and/or a flow of air. By doing this, when the defibration object progresses into the gap G, it is difficult for there to a large amount in the circumference direction of the rotor 90 and it is possible to feed the defibration object into the gap G in a state with fewer deviations in the progression position.

The arrangement of the input pipe 320 is not limited to the format described above and the input pipe 320 may be arranged in a direction to be further from the rotor 90 more than the feeding blade 40 in the extending direction of the central rotation axis 110. This arrangement is where D2 is larger than zero when referencing FIGS. 3 and 4. Due to the input pipe 320 being arranged in this manner, it is possible to effectively feed the defibration object to the rotor 90 using the feeding blade 40. That is, a flow of air which is caused by rotating of the feeding blade 40 flows in a direction which misses the input opening 321 of the input pipe 320. Due to this, it is difficult for the input of the defibration object from the input pipe 320 to be impeded. Due to this, it is possible to effectively feed the defibration object with regard to the gap G and it is possible to suppress transfer problems with the defibration object.

1.1.4. Operations of Defibrating Unit

It is possible for the defibrating unit 300 to carry out a dry-type defibrating process on the defibration object by the rotating unit 100 being rotated due to rotating of the rotation shaft 120 and the defibration object being introduced into the gap G between the rotating unit 100 and the fixing unit 200. It is possible for the rotation speed of the rotating unit 100 (number of rotations per minute (rpm)) to be appropriately set in consideration of conditions such as the throughput of the dry-type defibrating process, the period of time for retention of the defibration object, the extent of defibrating, and the shape and size of the rotating unit 100, the fixing unit 200, and the other members. In the defibrating unit 300 with the structure shown in FIG. 1, the rotation speed of the rotating unit 100 is, for example, 100 rpm or more and 11000 rpm or less, preferably 500 rpm or more and 9000 rpm or less, and more preferably 1000 rpm or more and 8000 rpm or less. In addition, it is not necessary for the rotation speed to be constant, and acceleration or deceleration may be performed to appropriately match the various conditions.

1.1.5. Period of Time for Retention of Defibration Object in Defibrating Unit

The defibration object is introduced from the input pipe 320 of the defibrating unit 300 and is discharged as defibrated material from the output pipe 330. At this time, the period of time for retention of the defibration object in the gap G between the rotating unit 100 and the fixing unit 200 (that is, the time in the gap G) is set in consideration of which type of the defibration object. In addition, the period of time for retention is set in consideration of a balance between the rotation speed of the rotating unit 100, the configurations, the shapes and the sizes of the rotating unit 100 and the fixing unit 200, the shape of the feeding blade 40, and the like.

In a case where the defibration object is a substance which is difficult to defibrate, it is preferable that the period of time for retention to set to be longer if the other conditions are the same. In addition, conversely, in a case where the defibration object is a substance which is easy to defibrate, it is preferable that the period of time for retention to set to be shorter if the other conditions are the same. On the other hand, in a case where the defibration object is a specific material, the length of the period of time for retention may be changed due to the extent of untangling of the defibration object, a case where the throughput is changes, and the like.

1.1.6. Step Section

The rotating unit 100 of the defibrating unit 300 of the present embodiment has the step sections 50. The step sections 50 are formed by the layering of a plurality of the rotating plates 10 and the partition plates 30 which are layered on both sides thereof. The partition plates 30 are arranged between the adjacent step sections 50. The number of the step sections 50 which are formed in the rotating unit 100 is arbitrary. As shown in FIGS. 1 and 5, four of the step sections 50 are formed in the present embodiment. In the rotating unit 100 of the present embodiment, the respective step sections 50 are referred to as the first step to the fourth step from the input pipe 320 side.

The rotating plates 10 which belong to one of the step sections 50 are layered so as to come into contact as described above. On the other hand, the partition plates 30 which are arranged between the step sections 50 are provided so as to come into contact with the rotating plates 10 and have a plate shape which is a circle which is the same as or smaller than a circle which is drawn by the tip end of the protruding sections 12 of the rotating plates 10 in a case where the rotation shaft 120 is rotated. That is, the size of the partition plates 30 is the same size or a size on the inner side of the tip end of the protruding sections 12 of the rotating plates 10.

It is possible for the material and the thickness of the partition plates 30 to be the same as the rotating plates 10. The partition plates 30 may have reduced material sections or bolt holes. Here, in a case where the rotating plates 10 have the reduced material sections 14, out of the partition plates 30, the partition plates 30, which are provided at the end sections in a direction along the rotation shaft 120 of the rotating unit 100, are a shape so as to cover and close off the portion of the reduced material sections 14 of the rotating plates 10. As already described above, the feeding blade 40 is provided at the end section of the rotating unit 100 on the input side. In a case where the feeding blade 40 has the blade plates 42, a portion of the reduced material sections 14 is covered by the feeding blade 40 if it is a shape where it is possible for the feeding blade 40 to contribute to the action in the same manner as the partition plates 30, and it is possible for the partition plates 30 to be omitted in this case.

The shape of the partition plates 30 is a shape which closes off at least a portion of grooves which extend in a direction along the rotation shaft 120 which is formed by the layering of the protruding sections 12 of the rotating plates 10 and may be a shape which closes off all of the grooves. The shape of the partition plates 30 is a shape which is not to be more to the outer side from the central rotation axis 110 than the protruding sections 12 of the rotating plates 10.

When the defibration object moves to the adjacent step section 50 with the partition plates 30 being provided and the plurality of step sections 50 being formed, the defibration object moves along the vicinity of the tip end of the protruding sections 12 due to the action of the partition plates 30. As a result, it is possible for the frequency with which the defibration object passes the vicinity of the tip end of the protruding sections 12 and for the defibrating process to be more reliably carried out compared to a case where the partition plates 30 are not provided. In addition, as described above, it is possible to further reliably perform the defibrating process since it is possible to lengthen the period of time for retention of the defibration object by providing the partition plates 30.

1.1.7. Gap

The gap G is a length where the radius of the circle (cylinder) which is drawn when the protruding sections 12 of the rotating plates 10 are rotated is subtracted from the radius of the circle (cylinder) which is inscribed on the surface on the inner side of the fixing plate 20 when the rotating unit 100 is arranged on the inner side of the fixing unit 200 (refer to FIGS. 3 and 7)

In the defibrating unit 300 of the present embodiment, the gap G is set to be larger than the thickness of the defibration object. Since the gap G is larger than the thickness of the defibration object, cutting is suppressed and mashing is suppressed when the defibration object enters into the gap (the gap between the rotating unit 100 and the fixing unit 200). It is preferable that the size of the gap G be approximately 2 to 300 times the thickness of the defibration object. It is possible for the gap between the rotating unit 100 and the fixing unit 200 to be appropriately adjusted by changing the outer diameter of the rotating plates 10 or the inner diameter of the fixing plates 20.

In the defibrating unit 300 described above, it is possible to effectively send the defibration object to the rotor 90 since the feeding blade 40 is provided in the rotating unit 100. In addition, since it is possible to generate a flow of air from the upstream side to the downstream side in the flow of the defibration object by providing the feeding blade 40, it is possible to generate a flow of air which is stronger than a flow of air which is generated using only the rotor 90. Due to this, it is possible to suppress transfer problems being generated in the defibrating unit 300.

In addition, due to the feeding blade 40, in addition to sending the defibration object, it is easy to defibrate the defibration object by hitting using the blade sections 41. That is, it is possible to feed the defibration object to the rotor with the defibration object having been reduced in size by being crushed. Furthermore, the defibration object which is input from the input section is mixed up using the feeding blade 40 and it is possible to suppress deviations in supplying of the defibration object with regard to the entire circumference of the rotor 90.

1.2. Other Configurations

The sheet manufacturing apparatus 1000 according to the present embodiment has a configuration where at least a portion of the defibrated material which passes through the defibrating unit 300 described above accumulates and is heated.

As illustrated in FIG. 10, the sheet manufacturing apparatus 1000 includes a crushing unit 400, the defibrating unit 300, a classifier unit 500, a screening unit 600, a resin supplying unit 700, an untangling unit 800, and a sheet forming unit 900 as shown in FIG. 10.

The crushing unit 400 cuts raw material such as pulp sheets or paper which is input (for example, A4 size used paper) in air and the raw material becomes small pieces. The shape and size of the small pieces is not particularly limited and are, for example, small pieces which are squares of a few centimeters. In the example in the diagrams, the crushing unit 400 has a crushing blade 401 and it is possible to cut the raw material which is input using the crushing blade 401. An automatic input unit for continuously inputting the raw material (which is not shown in the diagram) may be provided in the crushing unit 400. The crushing unit 400 may be provided as required and it is not necessary for the crushing unit 400 to be provided in a case of using raw material where cutting is not necessary. In addition, the crushing unit 400 performs a cutting process and does not perform the defibrating process, and differs in function compared to the defibrating process (a process of untangling into a fibrous form) which is performed in the defibrating unit 300 even if a defibrating action is slightly generated. As a detailed example of the crushing unit 400, a shredder can be given as an example.

The small pieces which are cut up by the crushing unit 400 are received by a hopper 405 and are introduced from the input opening 321 of the defibrating unit 300. The defibrating unit 300 carries out a defibrating process on the small pieces (the defibration object). The defibrating unit 300 generates defibrated material which is untangled into a fibrous form by carrying out a defibrating process on the small pieces. Defibrating becomes easier in the defibrating unit 300 using the small pieces from the crushing unit 400. In addition, using the small pieces from the crushing unit 400, it is easy for the defibration object to pass through the gap G and enter between the protruding portions 12 of the rotating plates 10. The defibrated material which is generated is discharged from the output opening 331 and is introduced into the classifier unit 500.

The classifier unit 500 separates and removes resin particles, ink particles, and the like from the defibrated material according to requirements. An air flow type of classifier device is used as the classifier unit 500. The air flow type of classifier device generates a revolving flow of air and separates using centrifugal force and the size and density of material which is classified, and it is possible to adjust the classifying points by adjusting the speed or centrifugal force of the air flow. In detail, a cyclone, an elbow jet, an eddy classifier, or the like may be used as the classifier unit 500. In particular, it is possible to favorably use a cyclone as the classifier unit 500 since the structure of the cyclone is simple.

The defibrated material which is classified by the classifier unit 500 is introduced into the screening unit 600. Unnecessary material which is separated using the classifier unit 500 is discharged to the outside of the classifier unit 500 by being passed through a discharge pipe 501. It is possible to avoid excessive resin in the defibrated material even when resin is supplied using the resin supplying unit 700 which will be described later since resin particles and the like are discharged to the outside through the discharge pipe 501 in a case where used paper is used as the raw material. In addition, the classifier unit 500 is not needed in the sheet manufacturing apparatus 1000 in a case where the raw material is pulp sheets and not used paper.

The screening unit 600 screens in air for whether the defibrated material where the defibrating process is carried out by the defibrating unit 300 is "passing material" which passes through the screening unit 600 and "residual material" which does not pass through the screening unit 600. It is possible for various types of sieves to be used as the screening unit 600. It is possible for material to pass through the screening unit 600 due to being screened depending on the length of fibers which are able to pass through the openings of a sieve out of the defibrated material where the defibrating process is carried out. The screening unit 600 is not an essential configuration and is provided according to the state of the defibrated material which is necessary for the sheets which are being manufactured. Here, the residual material, which has long fibers or is in a state of the defibrating process having been insufficient and does not pass through the screening unit 600, is transferred on the hopper 405 via a returning flow path 602 as shown in FIG. 10 and may be returned again to the defibrating unit 300.

The passing material which passes through a first opening of the screening unit 600 is transferred to an introduction port 801 of the untangling unit 800 via the resin supplying unit 700. A supply port 701 for supplying resin which bonds the fibers to each other is provided in the resin supplying unit 700.

The resin supplying unit 700 supplies resin from the supply port 701 into the air. That is, the resin supplying unit 700 supplies resin in a path from the screening unit 600 to the untangling unit 800 (between the screening unit 600 and the untangling unit 800). The resin supplying unit 700 is not particularly limited if it is possible to supply resin in the transfer path, and a screw feeder, a cycle feeder, or the like may be used as the resin supplying unit 700. Then, the defibrated material and the resin is mixed.

The resin which is supplied from the resin supplying unit 700 is resin for bonding the plurality of fibers. The plurality of fibers are not bonded at the point in time when the resin is supplied into the path. The plurality of fibers are bonded by the resin being hardened when passing through the sheet forming unit 900 which will be described later.

The resin which is supplied from the resin supplying unit 700 is thermoplastic resin or thermosetting resin. The resin which is supplied from the resin supplying unit 700 may be in a fibrous form or may be in a powder form. The amount of resin which is supplied from the resin supplying unit 700 is appropriately set according to the type of sheets which are being manufactured. Here, other than the resin which bonds the fibers which are untangled, a coloring agent for coloring the fibers which are untangled and an aggregation inhibitor for inhibiting aggregation of the fibers which are untangled may be supplied depending on the type of paper which is being manufactured.

The untangling unit 800 untangles the passing material which is entangled. Furthermore, the untangling unit 800 untangles the resin which is entangled in a case where the resin which is supplied from the resin supplying unit 700 is in a fibrous form. In addition, the untangling unit 800 uniformly accumulates the passing material and the resin at an accumulation section which will be described later.

It is possible to use a sieve as the untangling unit 800. The fibers and the resin which pass through the untangling unit 800 accumulate with uniform thickness and density on the accumulation section which will be described later. The untangling unit 800 is not an essential configuration in a case where there is no fibers which are entangled, a case of accumulating with entangling and without untangling, and the like.

The defibrated material and the resin which passes through the untangling unit 800 accumulate on an accumulation section 901 of the sheet forming unit 900. The sheet forming unit 900 has the accumulation section 901, stretching rollers 902, heating rollers 903, tension rollers 904, and winding roller 905 as shown in FIG. 10. The sheet forming unit 900 forms sheets using the defibrated material and the resin which passes through the untangling unit 800. The sheet forming unit 900 will be described in detail below.

Accumulating on the accumulation section 901 of the sheet forming unit 900 is carried out by the defibrated material and the resin which passes through the untangling unit 800 being received. The accumulation section 901 is positioned below the untangling unit 800. The accumulation section 901 receives the defibrated material and the resin and is, for example, a mesh belt. A mesh which is stretched by the stretching rollers 902 is formed in the mesh belt. The accumulation section 901 moves by driving of the stretching rollers 902. A web with a uniform thickness is formed on the accumulation section 901 due to the defibrated material and the resin from the untangling unit 800 building up continuously while the accumulation section 901 is continuously moved.

The defibrated material and the resin which accumulates on the accumulation section 901 of the sheet forming unit 900 is heated and pressurized by being passed through the heating rollers 903 along with the moving of the accumulation section 901. Due to the heating, the fibers are bonded to each other with the resin functioning as a bonding agent and are thin due to being pressurized, the surface is planarized by being passed through the tension rollers 904, and a sheet S is formed. The sheet S in the example in the diagram is wound using the winding roller 905.

It is possible to manufacturing the sheet S as above.

Here, the sheets which are manufacturing using the sheet manufacturing apparatus 1000 mainly refer to sheets with a sheet shape. However, the sheets are not limited to having a sheet shape and may have a board shape or a web shape. The sheet in the present specifications can be divided into paper or nonwoven material. Paper includes formats where fresh pulp or used paper is the raw material and which are formed in thin sheet shapes, and includes recording paper, wall paper, wrapping paper, colored paper, cartridge paper, drawing paper, and the like with the aim of writing or printing. Nonwoven material has greater thickness and lower strength compared to paper and typically includes nonwoven material, fiber board, tissue paper, kitchen paper, cleaning paper, filters, liquid absorbing materials, sound absorbing bodies, shock absorbing materials, mats, and the like. Here, plant fibers such as cellulose, chemical fibers such as PET (polyethylene-telephthalate) or polyester, or animal fibers such as wool or silk may be used as raw materials.

In addition, although no shown in the diagram, a water spraying device may be provide for spraying of additional water onto the accumulated material which accumulates on the accumulation section 901. Due to this, it is possible to increase the strength of hydrogen bonding when forming the sheet S. The straying of addition water is performed with regard to the accumulated material before passing through the heating rollers 93. Starch, PVA (polyvinyl alcohol), or the like may be added to the water which is sprayed by the water spraying device. Due to this, it is possible to further increase the strength of the sheet S.

In addition, a format with winding of the sheet S using the winding roller 905 is described in the example described above, but the sheet S may be cut into a desired size using a cutting device which is not shown in the diagram and may be stacked using a stacker or the like.

In the preset application, same and uniform include cases which are different within a range which is approximately ±10% in consideration of errors in processing, accumulation of dimensional precision of raw materials, and the like The embodiment of the invention is described above, but the invention is not limited to the embodiment described above and appropriate modifications are possible within a scope which does not depart from the gist of the invention.

Due to the sheet manufacturing apparatus 1000, it is possible to efficiently send the defibration object toward the rotor 90 since the feeding blade 40 is provided in the defibrating unit 300. In addition, it is possible to generate a flow of air which is stronger than a flow of air which is generated using only the rotor 90 since it is possible to generate a flow of air from the upstream side to the downstream side in the flow of the defibration object by providing the feeding blade 40. Due to this, it is possible to suppress transfer problems in the defibrating unit 300. As a result, it is possible to stably manufacture the sheet S which is strong in practice.

It is possible for the sheet manufacturing apparatus 1000 of the invention to manufacture sheets with at least the defibrating unit 300 and the sheet forming unit 900. It is sufficient if the configurations of the crushing unit 400, the classifier unit 500, the screening unit 600, the resin supplying unit 700, and the untangling unit 800 are added according to requirements. In addition, used paper in the present application mainly refers to paper on which printing is carried out but may include paper on which printing is not carried out but which has passed through a printing apparatus or paper which has not been used.

The invention is not limited to the embodiment described above and various modifications are also possible. For example, the invention includes configurations which are similar in practice to the configuration which is described in the embodiment (for example, configurations where the functions, methods, and effects are similar and configurations where the object and the effects are similar). In addition, the invention includes configurations where a portion which is not essential to the configuration which is described the embodiment is changed. In addition, the invention includes configurations with similar actions and effects as the configuration which is described the embodiment and configurations where it is possible to achieve a similar object to the configuration which is described the embodiment. In addition, the invention includes configurations where a known technique is added to the configuration which is described the embodiment.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A sheet manufacturing apparatus comprising:
    a defibrating unit including a rotating unit and a housing that relatively rotatably supports the rotating unit, the housing including a cover portion and a fixing unit that is attached to the cover portion and is spaced apart from the rotating unit in a direction perpendicular to an axial direction of the rotating unit so as to form a gap between the rotating unit and the fixing unit, the defibrating unit being configured to carry out a dry-type defibrating process on defibration object by rotating the rotating unit; and
    a sheet forming unit configured to form a sheet by accumulating and heating at least a portion of defibrated material on which the dry-type defibrating process is carried out,
    the rotating unit including a rotor that has a plurality of protruding sections on an outer circumference of the rotor, and a feeding blade that is arranged on a side section of the rotor on a side of an input section for the defibration object and configured to generate a flow of air.

2. The sheet manufacturing apparatus according to claim 1, wherein
    the feeding blade has a blade section that stands up in the axial direction in which a central rotation axis of the rotor extends.

3. The sheet manufacturing apparatus according to claim 1, wherein
    the input section for the defibration object is positioned in a direction to be further from the rotor more than the feeding blade in the axial direction in which a central rotation axis of the rotor extends.

4. The sheet manufacturing apparatus according to claim 1, wherein
    an input port in the input section for the defibration object is positioned more to a side of a central rotation axis of the rotor than an outermost circle in a trajectory generated while the blade section rotates, in the direction perpendicular to the axial direction in which the central rotation axis extends.

5. The sheet manufacturing apparatus according to claim 1, wherein
    the rotor has a base section on a side close to a central rotation axis of the rotor and the plurality of the protruding sections that protrude from the base section in a direction to be further from the central rotation axis, and
    the feeding blade is attached to the base section.

6. The sheet manufacturing apparatus according to claim 5, wherein
    a size of the feeding blade from a central rotation axis of the rotor is larger than the base section and is smaller than the protruding sections.

7. The sheet manufacturing apparatus according to claim 5, wherein
    the rotor is a layering of a plurality of rotating plates that have the base section and the protruding sections, and the feeding blade are fixed along with the plurality of rotating plates.

8. The sheet manufacturing apparatus according to claim 1, wherein
the rotor has an opening, and
the feeding blade covers the opening.

9. The sheet manufacturing apparatus according to claim 1, further comprising a cutting unit configured to cut material to be cut on an upstream side of the defibrating unit.

10. A defibrating unit configured to carry out a dry-type defibrating process on defibration object by rotating a rotating unit, the defibrating unit comprising:
the rotating unit including a rotor that has a plurality of protruding sections on an outer circumference of the rotor, and a feeding blade that is arranged on a side section of the rotor on a side of an input section for the defibration object and configured to generate a flow of air; and
a housing relatively rotatably supporting the rotating unit, the housing including a cover portion and a fixing unit that is attached to the cover portion and is spaced apart from the rotating unit in a direction perpendicular to an axial direction of the rotating unit so as to form a gap between the rotating unit and the fixing unit.

* * * * *